United States Patent [19]

Livingston

[11] Patent Number: 5,181,425
[45] Date of Patent: Jan. 26, 1993

[54] APPARATUS AND METHOD FOR TESTING TORQUE WRENCHES

[75] Inventor: Troy W. Livingston, Northbrook, Ill.

[73] Assignee: Ryeson Corporation, Franklin Park, Ill.

[21] Appl. No.: 694,805

[22] Filed: May 2, 1991

[51] Int. Cl.[5] .............................................. G01L 3/00
[52] U.S. Cl. ................................. 73/862.08; 73/1 C
[58] Field of Search ............... 73/1 C, 1 R, 862.08, 73/862.21, 862.26; 364/474.17, 506, 508

[56] References Cited

U.S. PATENT DOCUMENTS

| | | | |
|---|---|---|---|
| 2,706,903 | 4/1955 | Livermont | 73/862.08 X |
| 2,955,454 | 10/1960 | Husher | 73/1 C |
| 3,274,827 | 9/1966 | Sturtevant | 73/862.26 X |
| 3,999,426 | 12/1976 | Sonderegger | 73/862.08 |

Primary Examiner—Herbert Goldstein
Assistant Examiner—Elizabeth L. Shopbell
Attorney, Agent, or Firm—Richard W. Carpenter

[57] ABSTRACT

Torque wrench testing apparatus and method that includes holding a torque wrench, applying a predetermined torque load to one end of the wrench while limiting movement of the other end of the wrench, and measuring the actual torque applied, for comparison with the reading on the wrench gauge. The essential feature of the invention resides in the idea of limiting the movement of the other wrench end by a pylon that is pivotally mounted so that when it engages a pivotally mounted wrench handle, the handle will stay coaxial to the one end of the wrench to avoid a handle end from contacting the wrench beam, which would cause a change in the working length of the wrench beam and result in an incorrect calculation of torque.

20 Claims, 4 Drawing Sheets

APPARATUS AND METHOD FOR TESTING TORQUE WRENCHES

BACKGROUND OF THE INVENTION

1. Field of the Invention

This invention relates to torque wrench testing, and more particularly to an improved apparatus and method for testing torque wrenches that provides unique means for supporting and limiting the movement of a wrench being tested in such a way that the true and accurate distance between the work load axis and the handle axis of the wrench, which distance is utilized in the measurement of torque, will be maintained at all times regardless of the deflection of the torque wrench beam resulting from a torque load applied to the wrench.

2. Description of Background art

A background art search directed to the subject matter of this invention conducted in the United States Patent and Trademark Office disclosed the following United States Letters Patent:

| | | |
|---|---|---|
| 2,411,931 | 2,955,454 | 3,364,725 |
| 3,456,485 | 3,675,464 | 4,171,647 |
| 4,517,821 | 4,558,601 | 4,664,001 |

None of the patents found in the search disclosed a torque wrench testing apparatus or method including means for supporting and limiting the movement of a wrench being tested in such a way that the true distance between the work load axis and the handle axis of the wrench will be accurately maintained at all times regardless of the deflection of the torque wrench beam resulting from the torque load applied to the wrench.

SUMMARY OF THE INVENTION

It is an object of the present invention to provide a device and method for testing the accuracy of torque wrenches that includes means for supporting and limiting the movement of wrench being tested in such a way that the true and accurate distance between the work load axis and the handle axis of the wrench will be maintained at all times regardless of the deflection of the torque wrench beam resulting from the torque load applied to the wrench.

A more specific object of the invention is provision of a torque wrench tester of the type described wherein the pivotal handle of the wrench is engaged by a movement limiting pylon that is also pivotal, so the wrench handle is maintained in parallel relationship with the wrench beam throughout the application of a torque load to the drive end of the wrench.

These and other objects of the invention will be apparent from an examination of the following description and drawings:

It will be understood that, for purposes of clarity, certain elements may have been intentionally omitted from certain views, where they are believed to be illustrated to better advantage in other views.

DESCRIPTION OF THE PREFERRED EMBODIMENT

Figure 1:
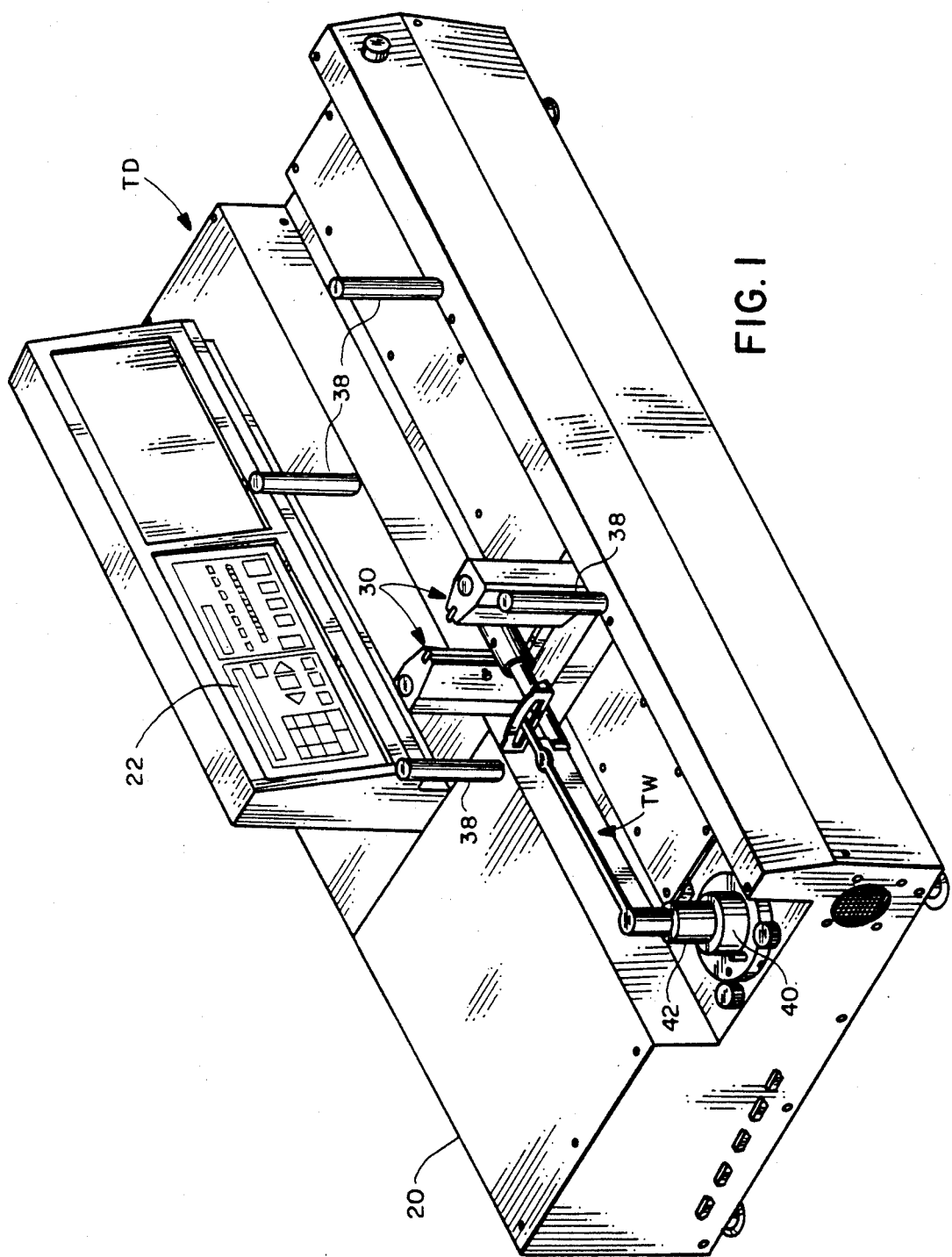
FIG. 1 is a fragmentary isometric view of a torque wrench testing device embodying features if the present invention, shown with a torque wrench positioned thereon for testing.

Referring now to the drawings for a better understanding of the invention, it will be seen that there is illustrated in FIG. 1 a torque wrench testing apparatus or device, indicated generally at TD, and a conventional torque wrench, indicated generally at TW, positioned thereon.

Torque wrench TW may be of a standard type that includes an elongated bar, lever, or beam 6 having, at one end thereof, a work engaging portion 8 presenting a square drive 10 adapted to engage a socket or adapter 12, and having, at the other end thereof, a hollow handle 14 pivotally mounted thereon at 15.

Figure 7:
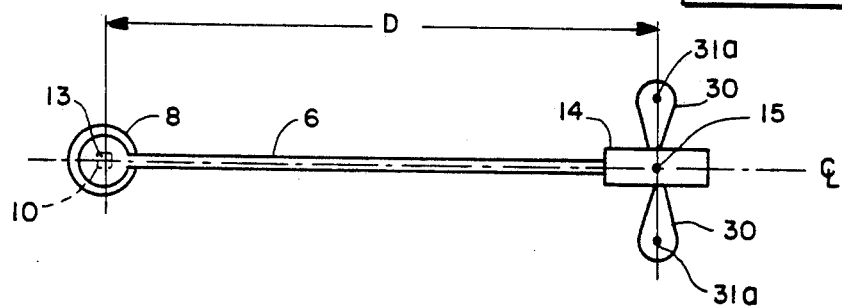
FIG. 7 is a diagrammatic view of a torque wrench, shown in an at rest or non-loaded condition.

The square drive 10 has a vertical axis 13, about which the work engaging end of the beam 6 is rotated, as hereinafter described. Thus, as best seen in FIG. 7, the true length of the wrench beam is the distance between pivot points or axes 13 and 15. This is the distance D used in the calculation of a torque load by the formula T (Torque)=F (Force) times D (Distance).

Wrench TW also includes a pointer arm 16 extending from the work engaging portion 8 toward handle 14 in parallel relationship with beam 6. At its free end, arm 16 presents a smaller section or pointer 16a receivable within a gauge or scale member 18 mounted on beam 6 adjacent handle 14.

Figure 2:
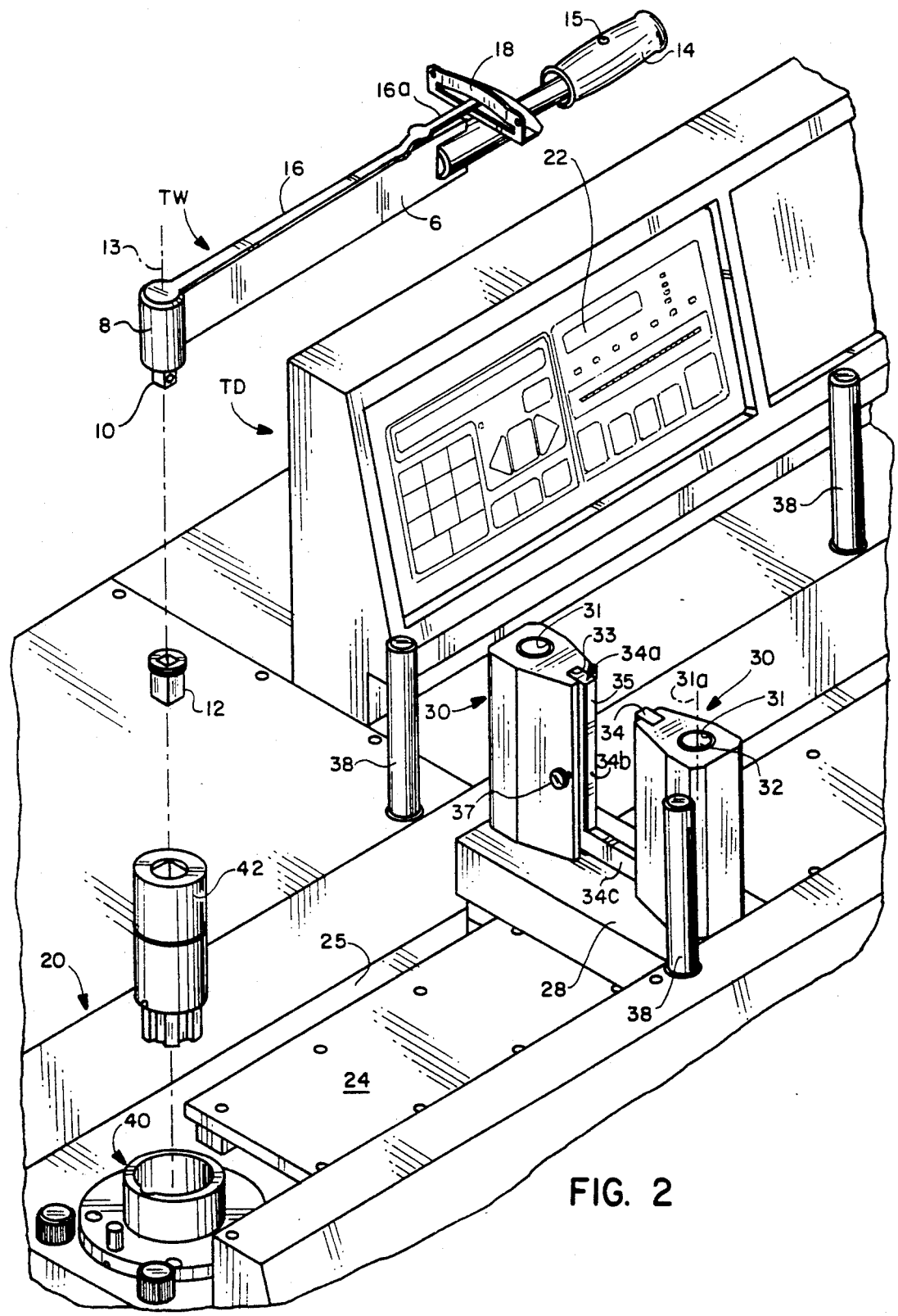
FIG. 2 is an enlarged view of a portion of the structure of FIG. 1, but with the torque wrench shown above the device prior to being positioned for testing.
Figure 3:
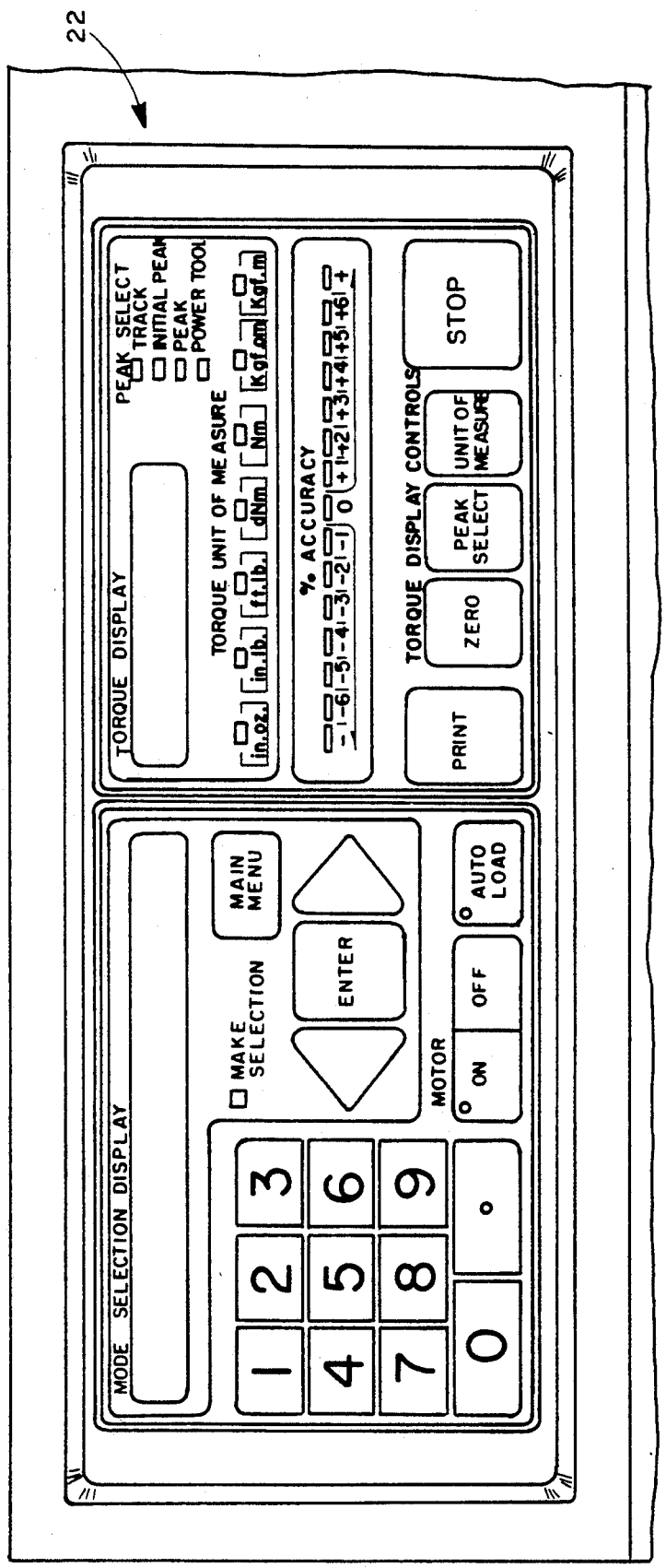
FIG. 3 is a front elevational view of the control/display panel of the device.

Referring now to FIGS. 1-3, it will be seen that the testing device TD includes a housing 20 that has an upwardly extending, vertical control/display panel 22. Housing 20 includes an external work station or deck 24 on which are mounted means for engaging and driving the work engaging end of a torque wrench being tested and means for engaging and limiting the movement of the handle end of the wrench.

Work station or deck 24 has a recessed area or well 25 in which is mounted a stationary platform 26. A second platform 28 is mounted for sliding movement transversely of work station 24 over stationary platform 26.

At the left side of the housing, as seen in FIGS. 1 and 2, is the mechanism, hereinafter described, for holding and applying a torque load to the work engaging portion of the wrench TW.

The essence of the present invention resides in the means for supporting the wrench and limiting the movement of the handle end of the wrench, in either direction, as a torque load is applied to the work engaging portion of the wrench. This is accomplished by a pair of unique motion limiting members or vector pylons 30 that are mounted on moving platform 28.

Pylons 30 are spaced from each other on the movable platform 28 a distance only slightly greater than the diameter of wrench handle 14. Each pylon has a cylindrical opening or bore 31 extending vertically therethrough that allows the pylon to be pivotally mounted on a related stationary column 32 extending vertically upward from the platform 28 through opening 31. The axis about which each pylon pivots is indicated at 31a.

The pylons 30 are each preferably generally wedge shaped, as seen from above, with the narrow portions of the pylons facing each other. The narrow portion of each pylon includes a vertically extending groove 33 adapted to receive a replaceable resilient pad 34 or 34a that presents a flat, vertical, outer surface 35. The function and operations of the pylons is described later in the specification.

Also, mounted on and extending upwardly from deck 24 are one or more pairs of fixed shafts 38, the purpose of which is to prevent the uncontrolled movement of a wrench which may not have been positioned properly in the work station prior to testing.

Figure 6:
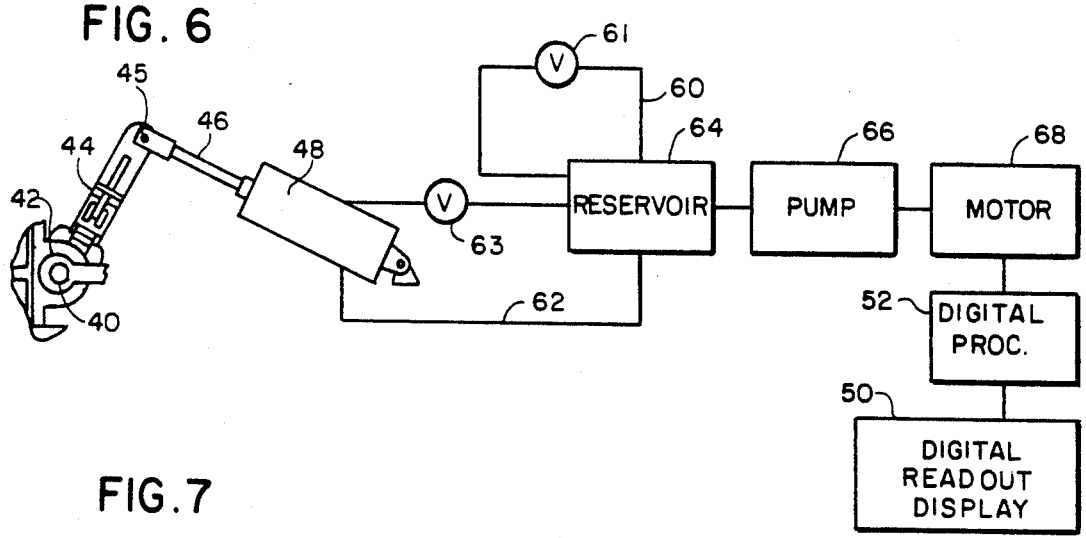
FIG. 6 is a diagrammatic view, partly in block form, illustrating the means for applying a torque load to the drive end of a torque wrench.

The manner in which the work engaging portion 8 of the wrench TW is supported and a torque load applied thereto is best illustrated in FIGS. 1, 2, and 6. A spline drive assembly, indicated generally at 40 is mounted in the well 25 of deck 24.

The upper end of the spline drive assembly is adapted to receive a transducer 42. The lower end is attached to and rotated by a drive lever 44 which is pivotally connected at 45 to a cylinder rod 46 projecting from a hydraulic cylinder 48.

As best seen in FIG. 6, cylinder 48 is actuated by hydraulic fluid transmitted from a reservoir 64 through a control line 62 by a hydraulic pump 66 connected to a motor 68. Once the motor is actuated, through a digital processor 52, the pump operates continuously to circulate fluid either around a by-pass line 60, or to the cylinder 48 through a control line 62, depending on whether the control valve 63 or the by-pass valve 61 is open. The motor is controlled by the digital processor 52 to which it is connected.

Figure 5:
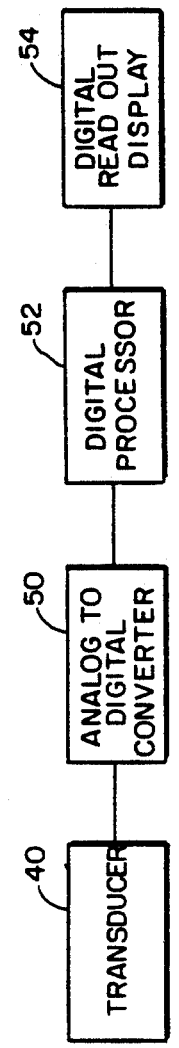
FIG. 5 is a block diagram illustrating certain of the internal electronic components of the device.
Figure 4:
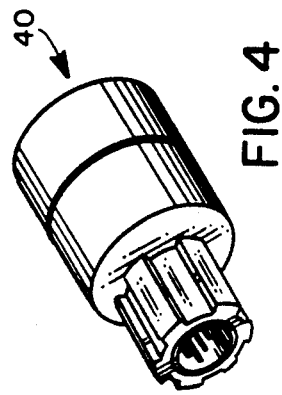
FIG. 4 is a fragmentary isometric view of the transducer illustrated in other views.

Referring now to FIG. 5, it will be seen that the transducer 40 is connected to an analog-to-digital converter 50, which in turn is connected to a digital processor or micro processor 52, that is connected to the control/display panel 54.

The transducer, analog-to-digital converter, digital processor, control/display panel components, hydraulic cylinder, pump, valves, lines, and motor, as well as certain other internal parts or mechanisms of the tester, are not specifically illustrated or described in detail, as they may be of a conventional nature and do not represent an essential feature of the present invention, except in so far as they relate to the application of a torque load to a wrench being tested.

In order to test the accuracy of a torque wrench, it is placed in the tester and a predetermined torque is applied by the tester, so the actual load applied can be compared with the load indicated on the dial of the scale or guage 18 of the wrench TW.

First the square drive 10 of the wrench is fitted into the adapter 12 and the adapter into the transducer 42 which is mounted in the spline drive assembly 40. Then the movable platform 28 is moved to the position shown in FIG. 1, with the wrench handle 14 positioned between the pylons 30 and the wrench supported on support member 38. The platform 28 should be so positioned that the centers of the pylons are aligned with the pivot 15 of the handle. Also, the height of the support should be adjusted, so the wrench beam is exactly horizontal.

At this point the controls of the tester are programmed, through the control/display panel switches thereon and the digital processor to apply a predetermined torque load to the wrench work engaging portion through the means previously described. As torque is applied to the wrench, beam 6 will deflect until lateral movement of the handle is stopped by a pylon. The torque time and load information is developed by the transducer and is transmitted to the digital processor through the analog-to-digital converter illustrated in FIG. 5.

As previously mentioned, the essential feature of the invention resides in the unique design and operation of the pylons 30, as they engage and limit the lateral movement of the wrench handle.

Turning now to FIGS. 7 of the drawings, which shows the wrench beam 6 in an at rest or no load position, it can be clearly seen that the true length of the lever is the distance between the pivot point 13 of the wrench work engaging portion and the pivot point 15 of the handle. This is the distance D used to measure torque in the formula T=FD.

Figure 8:
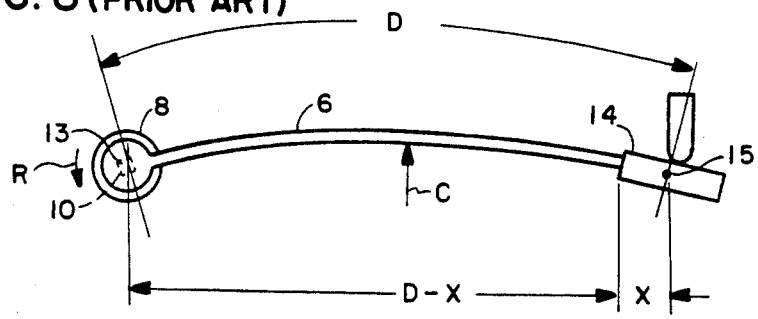
FIG. 8 is a diagrammatic view of a torque wrench, shown in a loaded condition on a conventional testing device.

Now turning to FIG. 8, which shows torque being applied to a wrench beam in a conventional torque tester, it will be seen that as the torque load is applied, the pivotally mounted handle pivots until one end of the handle comes in contact with the beam of the wrench. The result of this is that the effective length of the beam has become shortened from the true length D to an incorrect incorrect length D-X. Consequently, when the incorrect length D-X is automatically used by a tester in the formula, the amount of the torque load will be calculated incorrectly.

Figure 9:
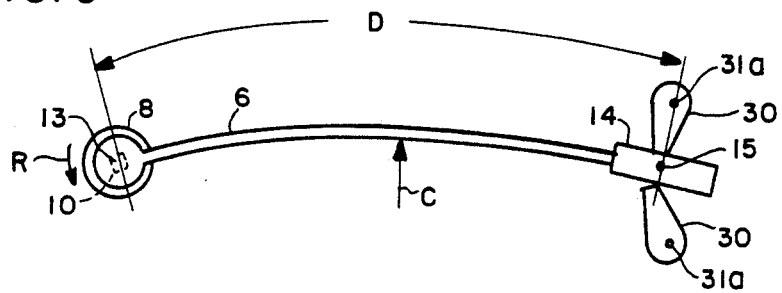
FIG. 9 is a diagrammatic view of a torque wrench, shown in a loaded condition on a testing device embodying the retaining means of the present invention.

Referring now to FIG. 9, which shows torque being applied to a wrench beam in a torque tester embodying features of the present invention, it will be seen that, as the related pylon is free to rotate about its pivotal axis 31a, the beam handle is engaged by the flat surface 35 of the pylon pad 34 or 34a allowing the handle to rotate and therebye remain in generally parallel relationship with the end of the wrench beam that is being deflected. This prevents an end of the handle from coming in contact with the beam, as in the case of the conventional tester illustrated in FIG. 8.

Since the pivotal axis of the pylon and the pivotal axis 15 of the wrench handle aligned with each other, the true distance D between the pivotal axes 13 and 15 is maintained at all times to insure that the calculation of torque by the tester will always be correct.

Although the work engaging portion of the wrench is supported by the transducer 42 and the spline drive assembly 40, it is also important to support the handle end of the wrench, so the wrench beam 6 will always be level and in a horizontal plane in order to obtain accurate data and information.

In order to provide support for the handle end of the wrench, the resilient pad 34a of one of the pylons 30 is generally L-shaped, having a vertical arm 34b, positioned in groove 33 of one of the pylons, and an integral horizontal arm 34c, extending laterally from the lower end of arm 34b toward the other pylon and adapted to support the handle end of the wrench. Vertical arm 34b of pad 34a can be moved vertically up and down in pylon slot 33, until it is in the proper position to keep the wrench level. Once positioned at the right height, the pad can be maintained in position by a set screw 37.

What is claimed is:

1. Apparatus for automatically testing the accuracy of a torque wrench that includes an elongated beam having at one end a work engaging portion having a pivotal axis and having at the other end thereof a hollow handle pivotally mounted thereon about a pivotal axis and a calibrated torque measuring gauge also mounted thereon adjacent said handle for cooperation with a pointer arm of said wrench, comprising:
   (a) a housing presenting an external work station and a control/display panel;
   (b) means at said work station for holding said wrench in a horizontal plane;
   (c) means for applying a specific predetermined torque load to said one wrench end;
   (d) means for limiting movement of said other wrench end while said torque load is being applied to said one wrench end;
   (e) means for measuring the torque load being applied to said one wrench end for comparison with a torque load indicated on said wrench gauge;
   (f) said movement limiting means including at least one vertically disposed pylon presenting a narrow, elongated, flat, vertical surface arranged and disposed for engagement with a central portion of said wrench handle;
   (g) said pylon being mounted for pivotal movement about a vertical axis, so that, when said handle is moved against said surface, free pivotal movement of the pylon will maintain said handle in coaxial relation with said other wrench end to prevent an end of said handle from contacting said beam and thereby changing a working length of said beam, the distance between the pivotal axes of said work engaging portion and said handle, used in calculating the torque applied.

2. Apparatus according to claim 1, wherein the pivotal axis of said pylon is parallel to the pivotal axis of said wrench work engaging portion and also to the pivotal axis of said wrench handle and is aligned with the axis of said wrench handle.

3. Apparatus according to claim 1, wherein said pylon is wedge shaped in horizontal cross-section and presents at a narrow side thereof a vertically extending groove and an elongated strip of resilient material positioned within said groove and presenting said wrench handle engaging surface.

4. Apparatus according to claim 1, wherein said torque applying means includes a drive assembly having a lower portion disposed in said housing and an upper portion extending upwardly out of said housing at said work station for engagement with a transducer member adapted to operatively receive said wrench work engaging portion.

5. Apparatus according to claim 4, wherein said drive assembly is driven by drive means located within said housing, said drive means including:
   (a) a drive lever connected to said drive assembly;
   (b) an hydraulic cylinder connected to said to said lever;
   (c) a pump and a reservoir of hydraulic fluid connected by lines to said cylinder;
   (d) a digital processor connected to said motor;
   (e) a control switch connected to said digital processor.

6. Apparatus according to claim 1, wherein said work station includes a drive assembly for applying a torque load to said one wrench end and a platform mounted on said housing for horizontal movement toward and away from said drive assembly, said platform having mounted thereon a pair of said pylons spaced from each other and a vertical wrench support member disposed between said pylons.

7. Apparatus according to claim 1, wherein said means for holding said wrench in a horizontal position includes a vertically adjustable support member at said work station presenting a horizontal surface for receiving said other wrench end.

8. Apparatus according to claim 7, wherein wrench holding means comprises a vertically adjustable, L-shaped, support member having a vertical arm, carried by said pylon, and an integral, horizontal arm, extending laterally from a lower end of said vertical arm.

9. Apparatus according to claim 8, wherein said L-shaped support member can be locked in position by a set screw mounted in said one pylon.

10. Apparatus for automatically testing the accuracy of a torque wrench that includes an elongated beam having at one end a work engaging portion having a pivotal axis and having at the other end thereof a hollow handle pivotally mounted thereon about a pivotal axis and a calibrated torque measuring gauge also mounted thereon adjacent said handle for cooperation with a pointer arm of said wrench, comprising:
   (a) means for holding said wrench in a horizontal plane;
   (b) means for applying a specific predetermined torque load to said one wrench end;
   (c) means for limiting movement of said other wrench end while said torque load is being applied to said one wrench end;
   (d) means for measuring the torque load being applied to said one wrench end for comparison with a torque load indicated on said wrench gauge;
   (e) said movement limiting means including at least one vertically disposed pylon presenting a narrow, elongated, flat, vertical surface arranged and disposed for engagement with a central portion of said wrench handle;
   (e) said pylon being mounted for pivotal movement about a vertical axis and presenting a flat surface arranged and disposed for engagement with said wrench handle, so that, when said handle is moved against said surface, free pivotal movement of the pylon will maintain said handle in coaxial relation with said other wrench end to prevent an end of said handle from contacting said beam and therebye changing a working length of said beam, the distance between the pivotal axes of said work engaging portion and said handle, used in the calculation of torque applied to the wrench.

11. Apparatus according to claim 10, wherein the pivotal axis of said pylon is parallel to the pivotal axis of said wrench work engaging portion and also to the pivotal axis of said wrench handle and is aligned with the axis of said wrench handle.

12. Apparatus according to claim 10, wherein said pylon is wedge shaped in horizontal cross-section and presents at a narrow side thereof a vertically extending groove and an elongated strip of resilient material positioned within said groove and presenting said wrench handle engaging surface.

13. Apparatus according to claim 10, and including a housing presenting an external work station that includes said means for holding said wrench in a horizontal plane.

14. Apparatus according to claim 13, wherein said torque applying means includes a drive assembly having a lower portion disposed in said housing and an upper portion extending upwardly out of said housing at said work station for engagement with a transducer member adapted to operatively receive said wrench work engaging portion.

15. Apparatus according to claim 14, wherein said drive assembly is driven by drive means located within said housing, said drive means including:
  (a) a drive lever connected to said drive assembly;
  (b) an hydraulic cylinder connected to said to said lever;
  (c) a pump and a reservoir of hydraulic fluid connected by lines to said cylinder;
  (d) a digital processor connected to said motor;
  (e) a control switch connected to said digital processor.

16. Apparatus according to claim 13, wherein said work station includes a drive assembly for applying a torque load to said one wrench end and a platform mounted on said housing for horizontal movement toward and away from said drive assembly, said platform having mounted thereon a pair of said pylons spaced from each other and a vertical wrench support member disposed between said pylons.

17. Apparatus according to claim 13, wherein said means for holding said wrench in a horizontal position includes a vertically adjustable support member at said work station presenting a horizontal surface for receiving said other wrench end.

18. Apparatus according to claim 16, wherein wrench holding means comprises a vertically adjustable, L-shaped, support member having a vertical arm, carried by said pylon, and an integral, horizontal arm, extending laterally from a lower end of said vertical arm.

19. Apparatus according to claim 18, wherein said L-shaped support member can be locked in position by a set screw mounted in said one pylon.

20. A method for automatically testing the accuracy of a torque wrench that includes an elongated beam having at one end a work engaging portion having a pivotal axis and having at the other end thereof a hollow handle pivotally mounted thereon about a pivotal axis for movement about an axis and a calibrated torque measuring gauge also mounted thereon adjacent said handle for cooperation with a pointer arm of said wrench, said method comprising holding said wrench in a horizontal plane, while at the same time:
  (a) applying a specific predetermined torque load to said one wrench end;
  (b) limiting movement of said other wrench end, while said torque load is being applied to said one wrench end, by contacting said handle intermediate its ends with a surface of a member mounted for movement about an axis parallel to and aligned with the pivotal axis of said handle, so that, when said handle is moved against said surface, the position of said handle will be maintained in coaxial relation with said other wrench end to prevent an end of said handle from contacting said beam and therebye changing a working length of said beam, the distance between the pivotal axes of said work engaging portion and said handle, used in the calculation applied to the wrench;
  (c) measuring the torque load being applied to said one wrench end for comparison with a torque load indicated on said wrench gauge.

* * * * *